(12) United States Patent
Choi et al.

(10) Patent No.: US 9,588,737 B2
(45) Date of Patent: Mar. 7, 2017

(54) RANDOM NUMBER GENERATING METHOD AND APPARATUS USING LIGHT SOURCE AND SINGLE PHOTON DETECTOR

(71) Applicant: SK TELECOM CO., LTD., Seoul (KR)

(72) Inventors: Jeong-woon Choi, Yongin-si (KR); Jeong-sik Cho, Daejeon (KR); Seok-beom Cho, Seongnam-si (KR); Chul-woo Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 9 days.

(21) Appl. No.: 14/682,007

(22) Filed: Apr. 8, 2015

(65) Prior Publication Data

US 2015/0212798 A1    Jul. 30, 2015

Related U.S. Application Data

(63) Continuation of application No. PCT/KR2013/007510, filed on Aug. 21, 2013.

(30) Foreign Application Priority Data

Oct. 8, 2012 (KR) .................. 10-2012-0111521

(51) Int. Cl.
*G06F 7/58* (2006.01)
*G01J 1/42* (2006.01)

(52) U.S. Cl.
CPC ............ *G06F 7/588* (2013.01); *G01J 1/4228* (2013.01); *G06F 2207/58* (2013.01)

(58) Field of Classification Search
CPC ...................................... G06F 7/588
USPC ........................................... 708/255
See application file for complete search history.

(56) References Cited

U.S. PATENT DOCUMENTS

| | | | |
|---|---|---|---|
| 5,732,139 A * | 3/1998 | Lo | H04L 9/0858 380/28 |
| 6,571,263 B1 | 5/2003 | Nagai | |
| 6,609,139 B1 * | 8/2003 | Dultz | G06F 7/588 708/250 |
| 7,519,641 B2 * | 4/2009 | Ribordy | G06F 7/588 708/255 |
| 2006/0010182 A1 * | 1/2006 | Altepeter | G06F 7/58 708/250 |
| 2007/0127718 A1 | 6/2007 | Ribordy et al. | |

(Continued)

FOREIGN PATENT DOCUMENTS

| | | |
|---|---|---|
| JP | 2007129386 A | 5/2007 |
| KR | 1020080111491 A | 12/2008 |
| WO | 2011023501 A1 | 3/2011 |

OTHER PUBLICATIONS

International Search Report for PCT/KR2013/007510 dated Dec. 11, 2013, citing the above reference(s).

*Primary Examiner* — Tan V. Mai
(74) *Attorney, Agent, or Firm* — Hauptman Ham, LLP (57) ABSTRACT

A random number generating includes a light source to emit a luminous flux having light intensity distribution symmetrical about a center axis, and a plurality of single-photon detectors arranged at an equal radial distance from an extending line of the central axis of the light source to generate a bit value of either 0 or 1 according to whether a photon is detected or not.

15 Claims, 9 Drawing Sheets

(56) References Cited

U.S. PATENT DOCUMENTS

2010/0217789 A1  8/2010  Saitoh et al.

* cited by examiner

RANDOM NUMBER GENERATING METHOD AND APPARATUS USING LIGHT SOURCE AND SINGLE PHOTON DETECTOR

CROSS-REFERENCE TO RELATED APPLICATION

The present application is a continuation of International Patent Application No. PCT/KR2013/007510, filed Aug. 21, 2013, which is based on and claims priority to Korean Patent Application No. 10-2012-0111521, filed on Oct. 8, 2012. The disclosures of the above-listed applications are hereby incorporated by reference herein in their entirely.

TECHNICAL FIELD

The present disclosure in one or more embodiments relates to a random number generating method and a random number generating apparatus using a light source and a single-photon detector.

BACKGROUND

The statements in this section merely provide background information related to the present disclosure and do not necessarily constitute prior art.

Randomness is demanded in a variety of applications ranging from numerical simulation to statistical analysis and to cryptography. Methods for obtaining randomness have evolved from a simple mathematical method for generating pseudo random numbers to methods for generating true random numbers by using physical phenomena.

Contrary to a pseudo random number generator (PRNG), a true random number generator (TRNG) is the concept of generating true random numbers based on electrical noise from sources including a resistor, a semiconductor diode, and a radioactive material.

From the same family of TRNG, a quantum random number generator (QRNG) implements the TRNG by generating true random numbers by utilizing the principles of quantum mechanics. The inventor(s) has noted that various kinds of the QRNG have been proposed based on the quantum characteristics of light to generate data, and many of them rely on the behavior of photons incident on a beam splitter.

SUMMARY

In accordance with at least one embodiment of the present disclosure, a random number generating apparatus includes a light source and a plurality of single-photon detectors. The light source is configured to emit a luminous flux having light intensity distribution symmetrical about a center axis, and the multiple SPDs are arranged at an equal radial distance from an extension line of the center axis of the light source and generates a bit value of either 0 or 1 according to whether a photon is detected or non-detected.

In accordance with another embodiment of the present disclosure, a random number generating apparatus performs a method for generating a random number using a light source and a single-photon detector, includes: emitting a luminous flux having light intensity distribution symmetrical about a center; generating a bit string according to whether a photon is detected by a plurality of single-photon detectors arranged at an equal radial distance from a symmetrical axis of the light intensity distribution; and performing a post-process for generating the random number based on the bit string output from the plurality of single-photon detectors.

In accordance with yet another embodiment of the present disclosure, a random number generating apparatus is configured to generate a random number using a result obtained by detecting a single photon from a luminous flux emitted from a light source at a plurality of points, converting whether the single photon is detected or non-detected into a digital value of 0 or 1, and then performing an arithmetic calculation on the digital value.

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for clarity and brevity.

Additionally, in describing the components of the present disclosure, terms like first, second, A, B, (a), and (b) are used. These terms are solely for the purpose of differentiating one component from another, and one of ordinary skill would understand the terms are not to imply or suggest the substances, order or sequence of the components.

Some embodiments of the present disclosure provide a random number generating apparatus and method for increasing random number generation speed through a plurality of single-photon detectors by taking advantage of statistical properties of light and detection efficiency of the single-photon detector.

Figure 1:
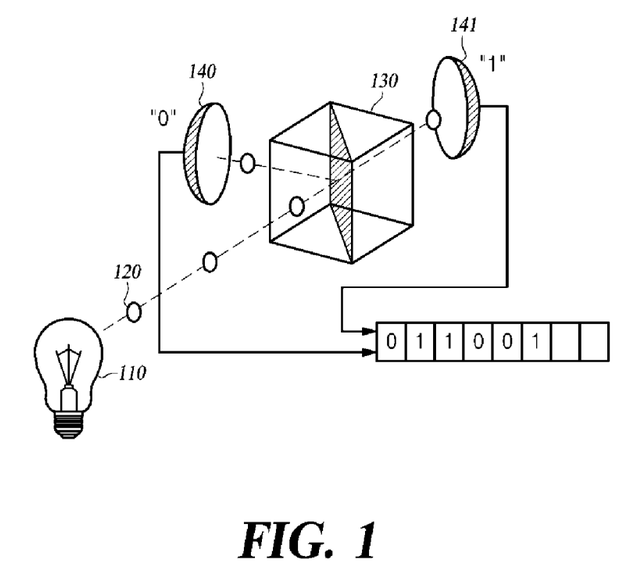
FIG. 1 is an exemplary diagram of a known quantum random number generator (QRNG) based on the behavior of photons incident on a beam splitter.

FIG. 1 is an exemplary diagram of a known quantum random number generator (QRNG) based on the behavior of photons incident on a beam splitter.

As illustrated in FIG. 1, a photon 120 emitted from a light source 110 is transmitted along one of the two paths by a beam splitter 130 and is detected by a corresponding one of the single-photon detectors (SPDs) 140 and 141. Depending on which one of the SPDs 140 and 141 detects the incident photon 120, 0 or 1 is generated. The inventor(s) has noted that through this method shown in FIG. 1, only one bit is able to be generated for each photon 120, and the actual implementation generates much less bits. The inventor(s) has also noted that since a detection event contributes to the generation of bits, a bit generation rate is limited by a detection speed and detection efficiency, and accordingly, speed for generating a random bit is inevitably lower than the highest detection speed of the SPDs 140 and 141. As a complement to the low speed, a method has been proposed for configuration of a QRNG with a plurality of single-photon detectors but it suffers from a bias due to different detection efficiencies of respective single-photon detectors.

Figure 2:
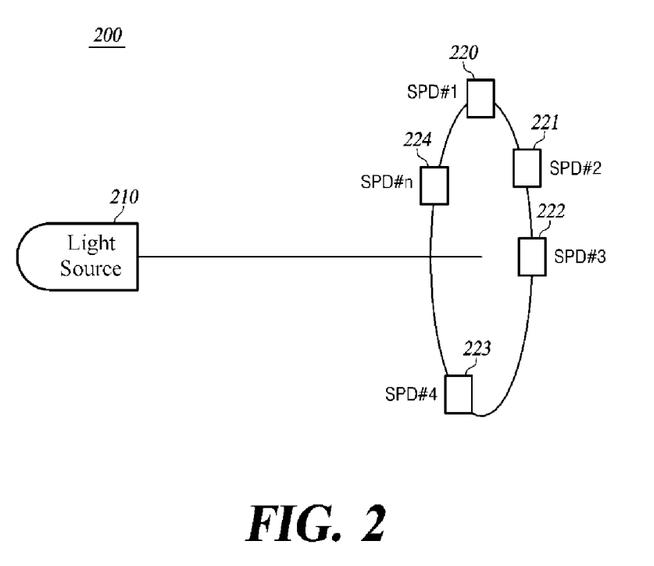
FIG. 2 is a schematic diagram of a configuration of a random number generating apparatus according to at least one embodiment of the present disclosure.

FIG. 2 is a schematic diagram of a configuration of a random number generating apparatus 200 according to at least one embodiment of the present disclosure.

As illustrated in FIG. 2, the random number generating apparatus 200 includes a light source 210 for emitting a light flux having light intensity distribution symmetrical about a center axis of the light source 210 and N single-photon detectors (SPDs) 220 to 224 that are arranged at an equal radial distance from an extension line of the center line of the light source 210. Each of the SPDs 220 to 224 generates a bit value of 0 or 1 according to whether a photon is detected at each clock. Since one bit is generated from the SPDs 220 to 224 at a duration (or period) of each clock, the random number generating apparatus 200 obtains N (N is a natural number) bits at each clock, thereby obtaining bit string generating speed N times higher than a known quantum random number generator (QRNG) based on a single-photon detector illustrated in FIG. 1. Although not illustrated in FIG. 2, the random number generating apparatus 200 further includes a random number generating function for generating a random number string based on bits output from the N SPDs. A method for generating a random number by a random number generating function will be described below with reference to FIGS. 4A-6. Other components of the random number generating apparatus 200, such as each of the light source 210, N single-photon detectors (SPDs) 220 to 224, and the random number generating function is implemented by, or includes, one or more processors and/or application-specific integrated circuits (ASICs).

In order to generate a random number based on the output bits of the SPDs 220 to 224, each single-photon detector outputs a bit of 0 or 1 at the same ratio, which means that the probability that each of the SPDs 220 to 224 (i.e., SPD#1 thru SPD#n) detects a photon needs to be controlled to be 50%. Hereinafter, the probability that each of the SPDs 220 to 224 detects a photon will be described.

Examples of an SPD include a semiconductor photon detector (SAPD) called an avalanche photodiode, a photo-multiplier tube (PMT) detector operated with an amplifier plate disposed between a cathode and an anode, and so on.

Photon number distribution of weak laser pulses exhibits Poisson distribution. The photon number distribution of partially absorbed light follows Bernoulli transform of an initial field, and thus the detected photon number distribution of weak laser pulses satisfies Equation 1 below.

$$P\eta(n) = \frac{(\eta\lambda)^n e^{-\eta\lambda}}{n!} \quad \text{Equation 1}$$

In Equation 1, $P_\eta$ is the detected photon number distribution probability, $\lambda$ is the average photon number of weak laser pulses, and $\eta$ is the detection efficiency of an SPD.

An ordinary SPD is able to only check detection/non-detection of photons. The inventor(s) has noted that the ordinary SPD has difficulty in determining the number of detected photons. Accordingly, bit 0 is be obtained when no photon is detected from an SPD, and bit 1 is obtained when one or more photons are detected.

Accordingly, the probabilities for obtaining the results of bit 0 and bit 1 are represented according to Equations 2 and 3 below.

$$P\eta(0) = e^{-\eta\lambda} \quad \text{Equation 2}$$

$$P\eta(n \geq 1) = 1 - e^{-\eta\lambda} \quad \text{Equation 3}$$

From Equations 2 and 3, $P_\eta(0)=0.5$ and $P_\eta(n \geq 1)=0.5$ are obtained when $\eta\lambda=0.693$.

Even when there is no photon emitted from a light source, an SPD often outputs detection event signals as if photons were detected, the detection ratio of which is called the dark count probability. The cause of a dark current generated in an avalanche photodiode, represented by a dark count is classified into three factors as follows. That is, a first factor is the generation of an electron-hole pair due to thermal excitation, a second factor is the generation of a current in a depletion region due to tunnel effect, and a third factor is afterpulsing where electrons generated by previously emitted light are confined and then avalanched by the next reverse bias. The photon detection probability of an SPD in consideration of the dark count probability is represented according to Equation 4 below.

$$P = 1 - e^{-\eta\mu} + \delta \quad \text{Equation 4}$$

In Equation 4, P is the photon detection probability of an SPD, $\eta$ is the detection efficiency of the SPD, $\mu$ is the light intensity of a luminous flux incident on the SPD, and $\delta$ is a coefficient for taking account of the dark count probability of the SPD according to temperature, noise, and so on.

Since $\eta$ is the determined characteristic of an SPD used for implementation and $\delta$ is a parameter that is difficult to control, the photon detection probability P of the SPD is set to 0.5 by adjusting $\mu$. For example, when $\eta=0.1$, $\delta=1 \times 10^{-5}$, photon detection probability P is set to 0.5 by adjusting light intensity $\mu$ of a light flux incident on the SPD to 7. $\mu$ is controlled by adjusting the output of a light source or adjusting a distance to the light source of the SPD, a distance from a center axis of the light source, or the like.

Figure 3:
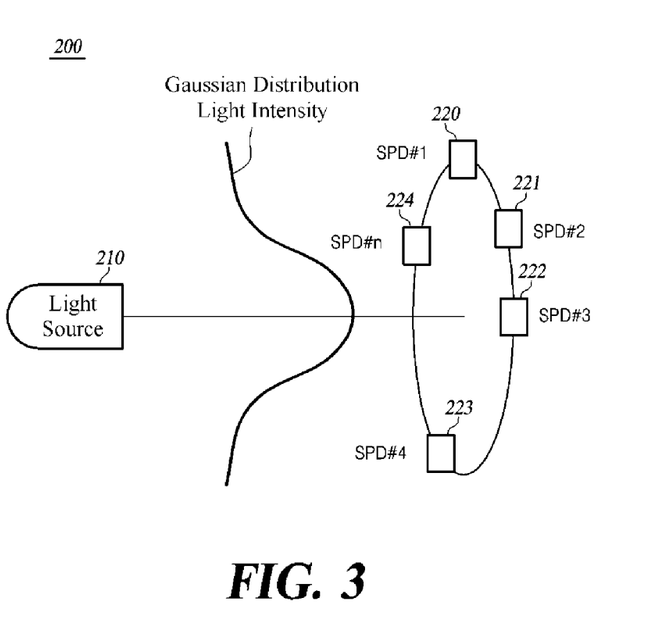
FIG. 3 is an exemplary diagram of the distribution of light intensity of a luminous flux generated from a light source according to at least one embodiment of the present disclosure.

FIG. 3 is an exemplary diagram of the distribution of light intensity of a luminous flux generated from a light source according to at least one embodiment of the present disclosure.

A random number generating apparatus 200 uses a plurality of SPDs, and thus light intensity $\mu$ of a luminous flux incident on each SPD is controlled to be kept equal.

When the light intensity distribution of a luminous flux emitted from a light source is axisymmetric, the light intensity of a luminous flux incident on each SPD is able to be maintained equal by positioning a plurality of SPDs to be at an equal radial distance from an extension line of a center axis of the light source. For example, as illustrated in FIG. 3, when using a light source that emits a luminous flux having Gaussian distribution, multitudes of luminous flux with the same intensity are incident on the SPDs 220 to 224 (i.e., SPD#1 thru SPD#n) that are arranged at an equal radial distance from the extension line of the center axis of the light source 210 by a predetermined interval. Accordingly, a light source according to at least one embodiment of the present disclosure may be a light source that emits a luminous flux having the light intensity distribution symmetrical about the center axis.

Unlike the known quantum random number generator (QRNG) in FIG. 1, which depends upon the behavior of photons incident on a light splitter, it is acceptable to employ a low-cost light emitting diode (LED) as well as a laser diode for generating coherent light pulses and even any type of light sources in practice because at least one embodiment of the present disclosure takes advantage of the photon detection efficiency or detection probability of an SPD. However, light intensity distribution of light emitting devices included in the light source does not usually follow Gaussian distribution or axisymmetric distribution, and thus an axisymmetric distribution is achieved by, if needed, additionally using an optical device such as a spatial filter, a lens, or the like.

Hereinafter, a method for generating a random number string from a bit string generated by the plurality of SPDs 220 to 224 of FIG. 2 will be described with reference to FIGS. 4A-6.

As described above, each of the SPDs 220 to 224 yields a bit of 0 or 1 according to whether photons are detected or not at a duration (or period) of each clock. Hereinafter, a set of bits output by one of the SPDs 220 to 224 is referred to as a 'unit bit string'.

Figure 4A:
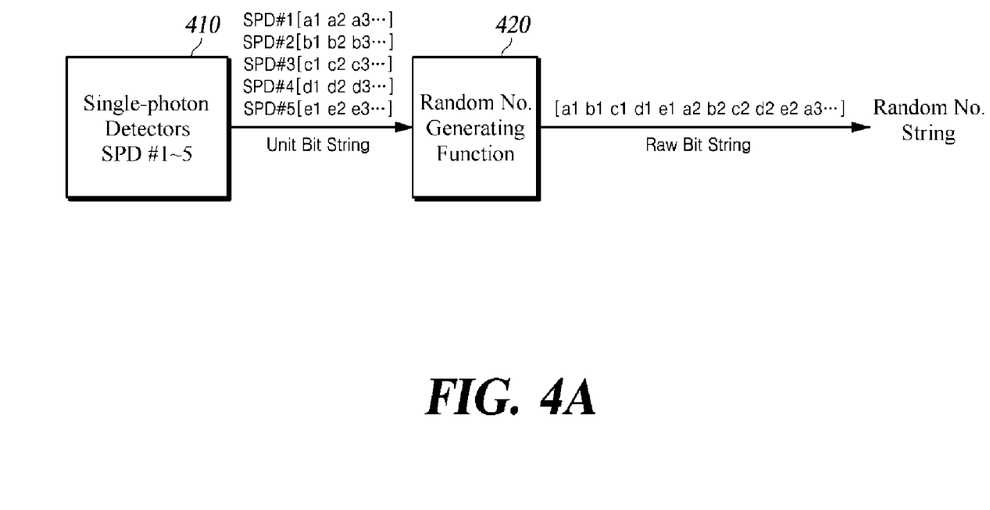
FIGS. 4A and 4B are diagrams of a method for generating a random number string by sequentially arranging bits output from respective single-photon detectors at each clock according to at least one embodiment of the present disclosure.
Figure 4B:
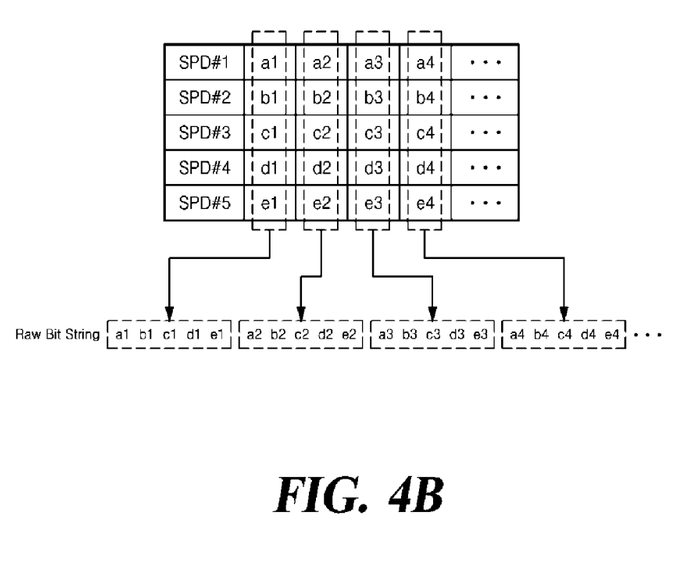

FIGS. 4A and 4B are diagrams of a method for generating a random number string by sequentially arranging bits output from respective single-photon detectors at each clock according to at least one embodiment of the present disclosure.

As illustrated in FIGS. 4A and 4B, assuming that a random number generating apparatus is designed using five SPDs 410 (i.e., SPD#1 thru SPD#5), a random number generating function 420 sequentially arranges each combination including a plurarity of bits, for example, combination {a1, b1, c1, d1, e1}, combination {a2, b2, c2, d2, e2}, combination bit {a3, b3, c3, d3, e3} . . . output from the five SPDs 410 at a duration (or period) of each clock so as to output a raw bit string in the form of [a1, b1, c1, d1, e1, a2, b2, c2, d2, e2, a3, b3, c3, d3, e3 . . . ] as a random number string.

When the photo detection probability of each of the SPDs 410 is exactly 0.5, a unit bit string generated from each of the SPDs 410 has complete randomness, and a random number string free of bias is obtained via such simple sequential arrangement.

In reality, however, a certain ratio of bias is present in the bit string output from each of the SPDs 410 due to its performance (e.g., η and δ) and other factors of each SPD 410. Accordingly, it is necessary to enhance randomness via a post-processing calculation instead of immediate generation of a random number string by sequentially arranging unit bit strings as illustrated in FIGS. 4A and 4B.

A post-processing calculation method based on parity bit calculation will be described herein for example among various methods of the post-processing calculation for enhancing randomness.

Figure 5A:
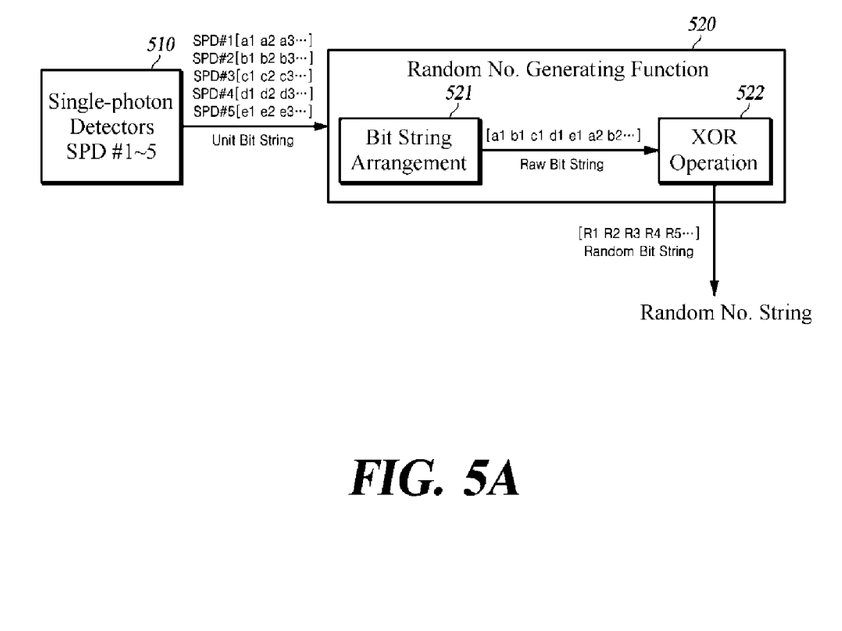
FIGS. 5A-5C are diagrams of a method for generating a random number string by exclusive-ORing (XORing) a raw bit string generated by sequentially arranging unit bit strings according to at least one embodiment of the present disclosure.
Figure 5B:
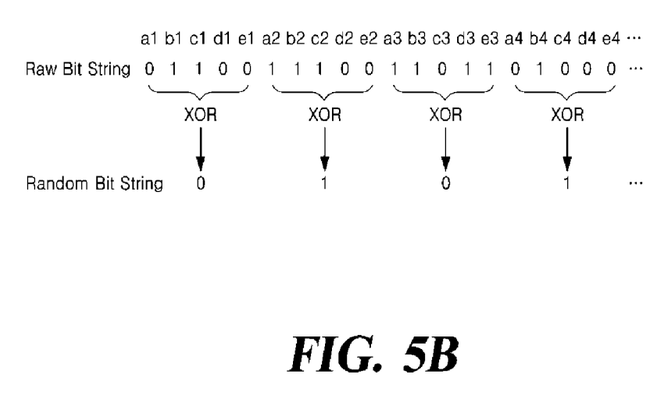
Figure 5C:
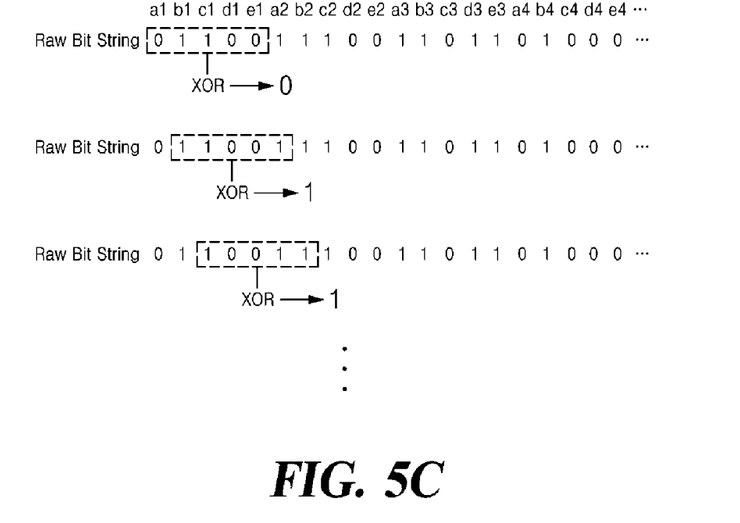

FIGS. 5A-5C are diagrams of a method for generating a random number string by exclusive-ORing (XORing) a raw bit string generated by sequencing unit bit strings according to at least one embodiment of the present disclosure.

As illustrated in FIG. 5A, a random number generating function 520 sequentially arranges bits generated by each of SPDs 510 at a duration (or period) of each clock and outputs a random bit string after performing XOR, i.e., calculation for generation of a parity bit on the sequentially arranged raw bit string. Components 521 and 522 of the random number generating function 520 are logically classified simply based on their functions rather than based on their physical characteristics. There are two methods for performing XOR calculation from a raw bit string as illustrated in FIGS. 5B and 5C.

The first method is for generating a parity bit after dividing a raw bit string into blocks of a predetermined number of bits. In this regard, FIG. 5B is an example of a method for generating a parity bit per every five bits. According to this method, the greater is the block for generating a parity bit, the more bias is removed from a raw bit string, resulting in an enhanced randomness of a random bit string. On the other hand, as the block for generating a parity bit gets greater, the generation ratio of a random bit string is reduced. In this regard, as seen from FIG. 5B, the amount of data of a random bit string to be obtained when XOR is performed every 5 bits is merely ⅕ of the raw bit string.

The second method is for preventing a reduction in the generation ratio of a random bit string. It includes the application of a mask of a predetermined size to generate parity bits by bit-by-bit shifting of the mask for consecutive parity bit calculations. For example, as illustrated in FIG. 5C, when a parity bit is generated for five bits, a first parity bit is calculated from bits of combination {a1, b1, c1, d1, e1} and a second parity bit with a bit shift is calculated from bits of combination {b1, c1, d1, e1, a2}.

Although the XOR operation illustrated in FIGS. 5A-5C enhances randomness by its application to a raw bit string, XOR operation is also performed on each output unit bit string from an SPD prior to the generation of the raw bit string, which will be described with reference to FIG. 6.

Figure 6:
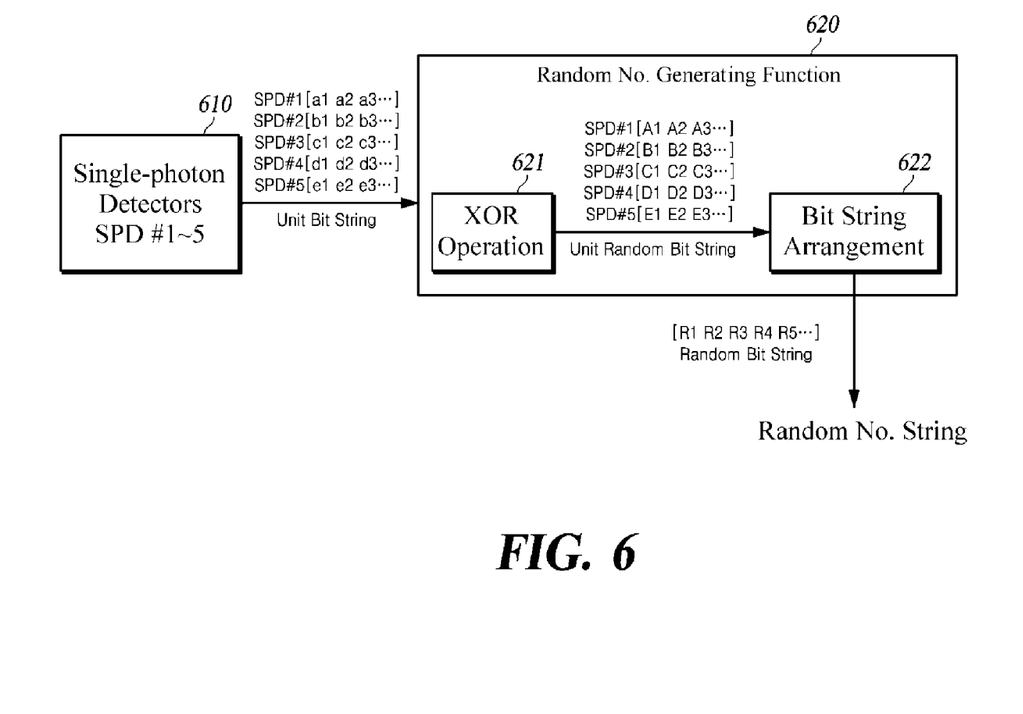
FIG. 6 is a diagram of a method for generating a random number string by XORing unit bit strings from respective single-photon detectors and then sequentially arranging the resulting strings according to at least one embodiment of the present disclosure.

FIG. 6 is a diagram of a method for generating a random number string by XORing unit bit strings from respective single-photon detectors and then sequencing the resulting strings according to at least one embodiment of the present disclosure.

As illustrated in FIG. 6, a random number generating function 620 performs the XOR operation on bits output from each of SPDs 610, i.e., on a unit bit string. A method for performing XOR is the same as the method described with reference to FIG. 5B or 5C. In FIG. 6, the result of the XOR operation performed on each unit bit string is denoted by a "unit random bit string." Then, the random number generating function 620 sequences parity bits included in each unit random bit string in the same method as the method described with reference to FIG. 4B to generate a random bit string to be used as a random number string. Components 621 and 622 of the random number generating function 620 are logically classified simply based on their functions rather than on their physical characteristics.

According to some embodiments of the present disclosure as described above, N bits are generated for each clock's cycle (or a period of each clock) through N single-photon detectors so as to generate a random number with speed higher than other methods for generating a true random number based on a single-photon detector. Photo detection probability of each single-photon detector is set to 0.5 by adjusting photon detection efficiency of a single-photon detector, luminous intensity of luminous flux incident on the single-photon detector, and so on, which allows the use of an a low-cost light emitting diode (LED) as well as a laser diode for generating coherent light pulses and even a random light source in practice. Parity operation is performed with a view to eliminating bias occurred in a random number string due to performance variance and the like of a plurality of single-photon detectors, thereby enhancing randomness. In addition, a random number generating apparatus according to at least one embodiment of the present disclosure generates a true random number and thus is appropriate for quantum cryptography applications.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. A random number generating apparatus, comprising:
   a light source configured to emit a luminous flux having light intensity distribution symmetrical about a center axis;
   a plurality of single-photon detectors (SPDs) arranged at an equal radial distance from an extension line of the center axis of the light source and configured to generate a plurality of bit strings, each bit string of the plurality of bit strings having values of either 0 or 1 according to whether corresponding SPD detects a photon or not at each clock period; and
   a random number generator configured to generate a random number based on the plurality of bit strings generated from the plurality of SPDs,
   wherein the random number generator is configured to
      sequence a plurality of combinations from the plurality of bit strings, each combination including a plurality of bits generated from the plurality of SPDs at each clock period, and
      generate a random number string by performing a parity generating calculation on the each combination.

2. The random number generating apparatus of claim 1, wherein the light intensity distribution of the light source is in axisymmetric distribution comprising Gaussian distribution.

3. The random number generating apparatus of claim 1, wherein the light source is an optical element configured to filter a luminous flux of a light emitting device so as to generate a luminous flux symmetrical about a center axis of the optical element.

4. The random number generating apparatus of claim 1, wherein each single-photon detector of the plurality of SPDs has a photo detection probability according to the following equation, $$P=1-e^{-\eta\mu}+\delta,$$

where P is photon detection probability of the single-photon detector, $\eta$ is a detection efficiency of the single-photon detector, $\mu$ is a light intensity of the luminous flux incident on the single-photon detector, and $\delta$ is a parameter for consideration of dark count probability of the single-photon detector.

5. The random number generating apparatus of claim 4, wherein $\eta$, $\mu$ and $\delta$ are set such that photon detection probability P of the single-photon detector is 0.5.

6. The random number generating apparatus of claim 1, wherein the random number generator is configured to
   generate a raw bit string comprising the sequenced plurality of combinations by clock sequence, and
   generate the random number string by performing the parity generating calculation on the generated raw bit string.

7. The random number generating apparatus of claim 6, wherein the random number generator is configured to
   generate a first parity bit by applying a mask of a predetermined size to the generated raw bit string,
   generate a second parity bit by applying the mask shifted at least one bit from where the first parity bit is generated, and
   generate the random number string based on the first and second parity bits.

8. A method performed by an apparatus for generating a random number using a light source and a plurality of single-photon detectors (SPDs), the method comprising:
   emitting a luminous flux having light intensity distribution symmetrical about a center axis;
   generating a plurality of bit strings using the plurality of SPDs arranged at an equal radial distance from a symmetrical axis of the light intensity distribution, each bit string having values of either 0 or 1 according to whether corresponding SPD detects a photon or not at each clock period;
   sequencing a plurality of combinations from the plurality of bit strings, each combination including a plurality of bits generated from the plurality of SPDs at each clock period; and
   generating a random number string by performing a parity generating calculation on the plurality of combination.

9. The method for claim 8, wherein the symmetrical light intensity distribution is in axisymmetric distribution comprising Gaussian distribution.

10. The method for claim 8, wherein each single-photon detector has photon detection probability of 0.5.

11. The method for claim 8, wherein the generating the random number comprises:
   generating a raw bit string comprising the sequenced plurality of combinations by clock sequence; and
   generating the random number string by performing the parity generating calculation on the generated raw bit string.

12. The method for claim 11, wherein the generating the random number string comprises
   generating the random number by calculating a parity bit with respect to each predetermined length of the generated raw bit string.

13. The method for claim 11, wherein the generating the random number comprises:
   generating a first parity bit by applying a mask of predetermined size to the generated raw bit string;
   generating a second parity bit by applying the mask shifted at least one bit from where the first parity bit is generated; and
   generating the random number string based on the first and second parity bits.

14. A method performed by an apparatus for generating a random number comprising:
   detecting, by a plurality of single-photon detectors (SPDs) arranged at a plurality of points, a plurality of photons from a luminous flux emitted from a light source;
   generating a plurality of bit strings by converting whether a photon is detected or non-detected into a bit value of either 0 or 1 at the plurality of points;

sequencing a plurality of combinations from the plurality of bit strings, each combination including a plurality of bits detected at the plurality of points at each clock period; and generating a random number string by performing a parity generating calculation on the plurality of combinations.

15. A random number generating apparatus, comprising:

a light source configured to emit a luminous flux having light intensity distribution symmetrical about a center axis;

a plurality of single-photon detectors (SPDs) arranged at an equal radial distance from an extension line of the center axis of the light source and configured to generate a plurality of bit string, each bit string having values of either 0 or 1 according to whether corresponding SPD detects a photon or not at each clock period; and a random number generator configured to
- calculate a plurality of parity bits by performing a parity generating calculation on each bit string output from each single-photon detector of the plurality of single-photon detectors during a predetermined period, and
- generate a random number string by sequencing the calculated plurality of parity bits.

* * * * *